(12) United States Patent
Gagnon

(10) Patent No.: US 6,786,467 B2
(45) Date of Patent: Sep. 7, 2004

(54) LONGER STROKE CONTROL VALVE AND ACTUATOR

(75) Inventor: Frederic Gagnon, Chatham (CA)

(73) Assignee: Siemens VDO Automotive Inc., Chatham (CA)

(*) Notice: Subject to any disclaimer, the term of this patent is extended or adjusted under 35 U.S.C. 154(b) by 129 days.

(21) Appl. No.: 10/213,229

(22) Filed: Aug. 6, 2002

(65) Prior Publication Data
US 2003/0141474 A1 Jul. 31, 2003

Related U.S. Application Data
(60) Provisional application No. 60/354,013, filed on Jan. 31, 2002.

(51) Int. Cl.$^7$ .......................... F02M 25/07; F16K 31/06
(52) U.S. Cl. .................................. 251/129.15; 335/255
(58) Field of Search ...................... 251/129.01–129.22; 335/220, 255–282, 289–301

(56) References Cited

U.S. PATENT DOCUMENTS

| | | | | | |
|---|---|---|---|---|---|
| 3,670,274 | A | * | 6/1972 | Ellison | 335/260 |
| 4,518,938 | A | * | 5/1985 | Bartholomaus et al. | 335/262 |
| 4,725,802 | A | * | 2/1988 | Johnson et al. | 335/258 |
| 5,237,980 | A | * | 8/1993 | Gillier | 123/520 |
| 6,220,277 | B1 | * | 4/2001 | Blain | 137/271 |
| 6,474,320 | B1 | * | 11/2002 | Modien | 123/568.21 |

* cited by examiner

Primary Examiner—Paul J. Hirsch

(57) ABSTRACT

An electric actuated control valve, such as an EGR valve, has a solenoid that can deliver useful force over a longer stroke for operating a valve element.

21 Claims, 3 Drawing Sheets

LONGER STROKE CONTROL VALVE AND ACTUATOR

CROSS REFERENCE TO RELATED APPLICATIONS

This application claims priority to and benefit of provisional patent application Serial No. 60/354,013, filed Jan. 31, 2002, the disclosure of which is incorporated by reference herein in its entirety.

FIELD OF THE INVENTION

This invention relates generally to electric-actuated control valves, such as valves for controlling flow of fluids in automotive vehicle engine systems. In particular, the invention relates to improvements for increasing the useful stroke of such a valve by enhancing the force vs. stroke characteristic of the valve actuator. Examples of such valves are exhaust gas recirculation (EGR) valves and fuel cell valves.

BACKGROUND OF THE INVENTION

The actuator of certain control valves of automotive vehicle engine systems comprises a solenoid that comprises an electromagnet coil and a stator having an air gap at which magnetic flux acts on an armature. The armature motion is transmitted to a valve element to control flow through a passage of the valve. Armature motion is resisted by a return spring that acts on the armature, either directly or via the valve element, to bias the armature toward a position that causes the valve element to close the passage.

The stator air gap is defined by an upper pole piece that is disposed at an upper end of the coil and a lower pole piece at a lower end of the coil. The pole pieces have respective annular hubs that fit into an interior space bounded by the coil, approaching each other from opposite ends of the coil. The juxtaposed ends of the two hubs are spaced apart to define the air gap as a generally annular space within which the armature is centered and along which the armature can travel. Electric current in the coil creates magnetic flux that passes from one hub through a portion of the air gap to the armature, through the armature, and back across another portion of the air gap to the other hub. The flux creates an electromagnetic force on the armature, and the axial component of that force acts to displace the armature along the centerline of the solenoid against the resistance of the return spring. In order to operate the valve from closed to open, the solenoid must apply a force that is greater than the sum of the bias force being applied by the return spring and any other forces acting on the valve.

For achieving improved control, it is desirable that the valve actuator be able to deliver increasing force over an increased stroke length. However, certain constraints that are imposed on certain automotive vehicles, especially mass-produced vehicles that are subject to governmental regulation, make it impossible, impractical, and/or uneconomical simply to use a larger solenoid. Accordingly, it is believed that a valve that is capable of delivering increasing force over an increased stroke length, without accompanying increases in size and weight that would be deemed unacceptable, would be useful to automotive vehicle manufacturers in complying with constraints imposed on the vehicles that they manufacture.

SUMMARY OF THE INVENTION

The present invention relates to a valve that is capable of delivering increasing force over an increased stroke length, without accompanying increases in size and weight that would be deemed unacceptable.

One general aspect of the invention relates to an electric-actuated control valve for controlling flow of fluid in an automotive vehicle engine system. The valve comprises a valve body comprising a passage having an inlet port for receiving fluid and an outlet port for delivering fluid. A mechanism selectively positions a valve element to selectively restrict the passage. The mechanism comprises a solenoid actuator comprising a bobbin having a tubular core of non-ferromagnetic metal and ferromagnetic pole pieces at axial ends of the tubular core. An electromagnet coil comprising a length of magnetic wire is wound on the tubular core between flanges of the pole pieces. The pole pieces form portions of a magnetic circuit for magnetic flux created by electric current in the coil and comprise hubs that protrude into the tubular core and have juxtaposed ends defining an air gap within the tubular core through which the magnetic flux passes between the pole piece hubs. The mechanism further comprises an armature that is guided for motion axially of the tubular core for positioning the valve element and that comprises ferromagnetic material for conducting magnetic flux created at the air gap when electric current flows in the coil to cause an axial component of electromagnetic force to be exerted on the armature for positioning the valve element.

Another aspect relates to the solenoid actuator itself.

Still another aspect relates to a method of making the valve and the actuator.

The accompanying drawings, which are incorporated herein and constitute part of this specification, include a presently preferred embodiment of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
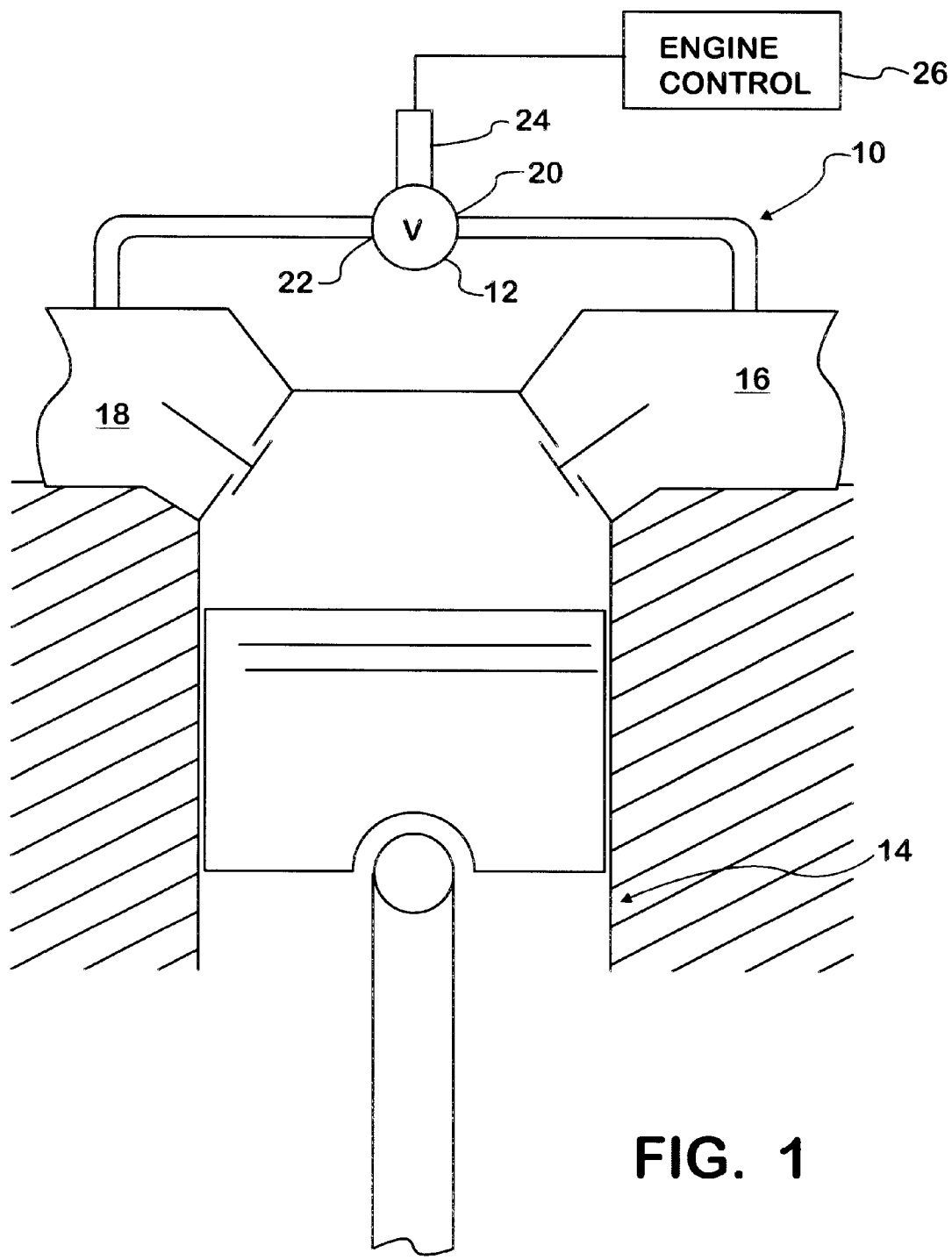
FIG. 1 is a schematic diagram of an engine system that comprises a valve in accordance with principles of the present invention.

FIG. 1 shows an exemplary emission control system 10 having an electric exhaust gas recirculation valve (EEGR valve) 12 associated with an internal combustion engine 14 to control the flow of exhaust gas being recirculated from an exhaust system 16 of the engine to an intake system 18 of the engine.

Valve 12 comprises a body containing a flow passage extending between a valve inlet port 20 communicated to exhaust system 16 and a valve outlet port 22 communicated to intake system 18.

Valve 12 further comprises an electromagnetic actuator 24, namely a solenoid, which is under control of an engine control system 26 to control the extent to which valve 12 allows exhaust gas to be recirculated through the flow passage in the valve body. In the closed position of valve 12 that blocks exhaust gas recirculation, a preloaded return spring within the valve body is resiliently biasing a valve element to close on a valve seat in the flow passage, closing the flow passage to flow of exhaust gas between ports 20 and 22.

As engine control system 26 delivers increasing electric current to actuator 24, a point is reached where the current is sufficiently large to create sufficient force for overcoming the spring bias. Further increases in current increasingly open the valve.

Figure 2:
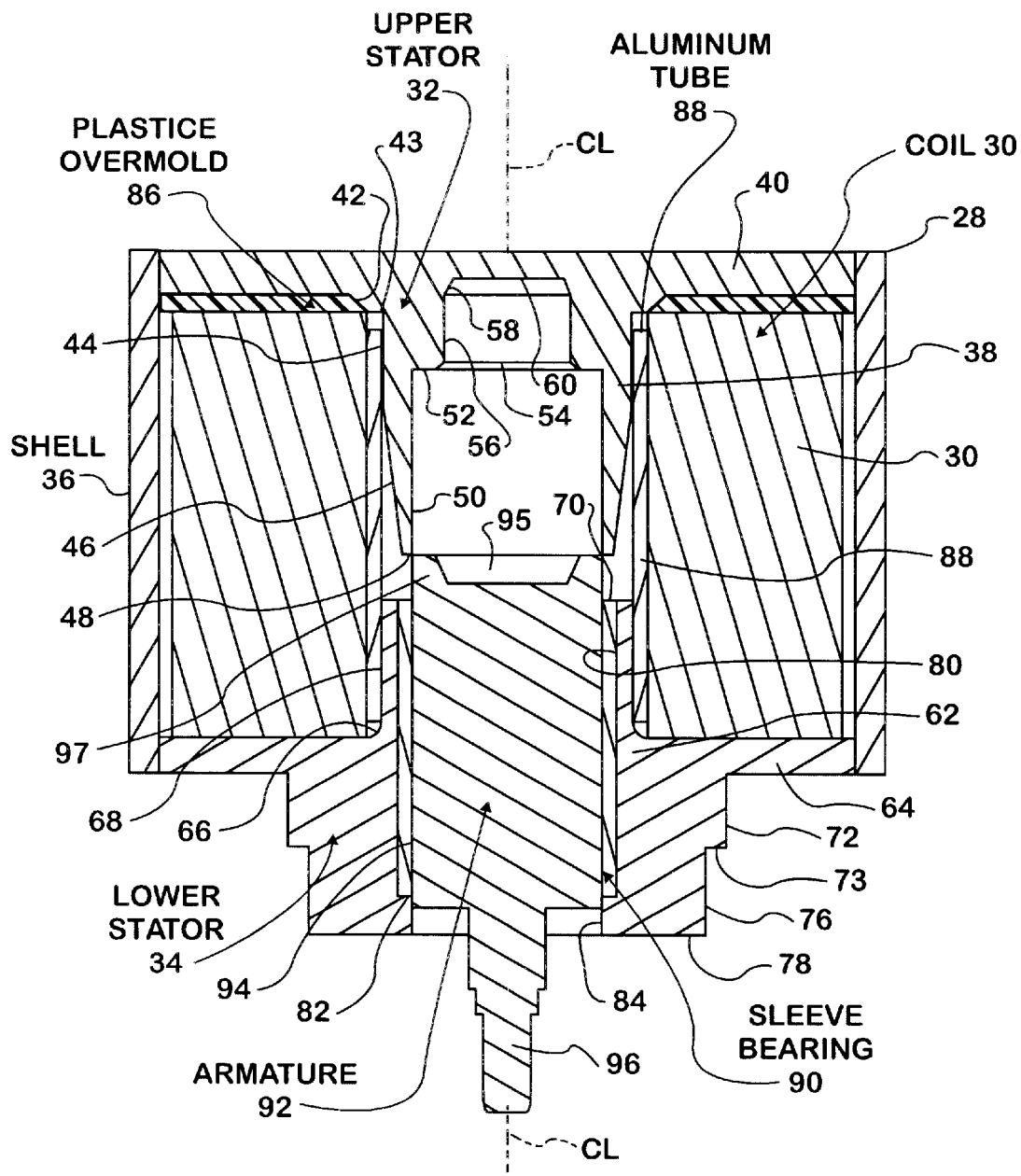
FIG. 2 is a cross section view, in elevation, of an exemplary embodiment of an actuator of the valve of FIG. 1 embodying the present invention.

The improvement that is achieved by the present invention is accomplished through actuator 24, detail of which appears in FIG. 2.

Actuator 24 comprises stator structure 28 associated with an electromagnet coil 30 to form a portion of a magnetic circuit path. The stator structure comprises an upper pole piece 32, disposed at one end of the actuator coaxial with a centerline CL, a lower pole piece 34 disposed at the opposite end of the actuator coaxial with centerline CL, and an outer cylindrical shell 36. All three pieces 32, 34, 36 comprise ferromagnetic material.

Upper pole piece 32 comprises a circular end wall 40 and an annular walled hub 38 that extends interiorly from an interior face of end wall 40. The junction of the hub and flange comprises a chamfer 42 between a radially outer surface of hub 38 and the interior face of end wall 40. The chamfer ends at a shoulder 43 in the outer hub surface, and beyond that shoulder the outer hub surface continues axially as a circular cylindrical surface 44. Beyond surface 44, the outer hub surface continues as a frustoconical surface 46, finally ending at a narrow flat end face 48 that is perpendicular to centerline CL.

The radially inner surface of hub 38 comprises a circular cylindrical counterbore 50 extending into the hub from face 48 as far as an internal shoulder 52. The radially inner hub surface continues axially from shoulder 52 as a chamfer 54, and then as a circular cylindrical bore 56, finally ending via a chamfer 58 at an end face 60 that is perpendicular to centerline CL. Counterbore 50 and bore 56 thereby form a blind hole in pole piece 32 that is centered on centerline CL.

Lower pole piece 34 comprises a central hub 62 and a circular flange 64 that girdles hub 62 intermediate opposite axial ends of hub 62. One portion of hub 62 that extends from an interior face of flange 64 comprises an annular wall. The junction of flange 64 and that annular wall comprises a chamfer 66 extending between the interior face of flange 64 and the outer surface of the hub wall. From chamfer 66, the outer surface of the hub wall continues as a circular cylindrical surface 68 ending at an end face 70 that is perpendicular to centerline CL. The portion of hub 62 extending from the exterior face of flange 64 comprises an annular wall whose radially outer surface is a circular cylindrical surface 72 beginning at flange 64 and ending at a shoulder 73. From shoulder 73, the outer wall surface continues as a circular cylindrical surface 76 and ends at an end face 78 that is perpendicular to centerline CL.

Lower pole piece 34 further comprises a through-hole that forms the inner hub surface and comprises a circular cylindrical counterbore 80 extending from end face 70 and ending at an internal shoulder 82. A circular cylindrical bore 84 extends from shoulder 82 to end face 78.

Pole pieces 32, 34 are assembled to a non-ferromagnetic tube 88, one pole piece at one end of the tube, the other pole piece at the opposite end. Tube 88 has a circular cylindrical shape of uniform radial thickness. One end of tube 88 fits over hub 38, being centered on surface 44 and axially abutting shoulder 43. The other end of tube 88 fits over the upper end of hub 62, being centered on surface 68 and abutting chamfer 66.

The assembly of pole pieces 32, 34 and tube 88 forms a bobbin on which magnet wire is wound to create coil 30. Ends of the wire are led through a plastic overmold 86 and a clearance opening (not shown) in flange 40 where they can be attached to electric terminals in a cap of the valve actuator (also not shown). The cap terminals protrude externally from the cap material where they are bounded by a surround of cap material to form a connector adapted for mating connection with a wiring harness connector for connecting the coil to control system 26. The plastic overmold 86 separates the wound coil wire from direct contact with end wall 40 of upper pole piece 32, and is believed useful in damping vibrations. Although not shown in the drawing, a thin layer of insulating plastic or paper may be disposed around tube 88 and similar thin insulating sheets disposed over the interior face of end wall 40 and that of flange 64 for insulation between the coil wire and the metal parts of the stator structure.

A sleeve bearing 90, carbon steel for example, is fit to surface 84 to provide guidance for axial travel of an armature 92 of actuator 24. Such an insert may not always be needed, and replaced by a sleeve of thin non-magnetic material. Armature 92 is guided only on lower pole piece 34 and not the upper pole piece.

Armature 92 comprises ferromagnetic material having a circular cylindrical outer surface 94 guided by the inner surface of bearing 90. The axial length of the armature overlaps the hubs of both pole pieces. At its lower end armature 92 comprises a valve actuating stem 96 that protrudes from lower pole piece 34.

An air gap is present between confronting ends of hubs 38 and 62 within space bounded by coil 30. Armature 92 is disposed in the air gap between juxtaposed ends of the pole piece hubs. When coil 30 is energized by electric current, magnetic flux passes from one hub across one portion of the air gap, through that portion of the armature disposed at the air gap, through another portion of the air gap, and to the other hub. Exterior to coil 30, the magnetic circuit is completed from one pole piece to the other through shell 36. Flanges 40 and 64 have matching circular edges, and shell 36 is fit to those edges.

The end of armature 92 disposed at the air gap has a shape that is believed beneficial in concentrating flux without saturation to improve the force vs. travel characteristic of the actuator. A frustoconical counterbore 95 is present in the end face of the armature, creating a raised annular rim 97 that bridges much of the distance between the confronting ends of the hubs of the respective pole pieces. Rim 97 is the portion of the armature through which the magnetic flux is conducted between the pole pieces at the air gap and comprises a circular radially outer surface and a frostoconical tapered radially inner surface. Rim 97 has a widening taper in the direction from the tapered wall of hub 38 toward hub 62 of pole piece 34.

In the closed position of valve 10, the preloaded return spring (not shown) is resiliently biasing the valve element to close the flow passage between ports 20 and 22. That spring forms an element of the internal valve mechanism, functioning via the valve element to resiliently bias armature 92 to an initial position along centerline CL when no current flows in coil 30.

As electric current begins to increasingly flow through coil 30, the magnetic circuit exerts increasing electromagnetic force urging armature 92 in the downward direction as viewed in FIG. 1. Once the force is large enough to overcome the bias of the preload force of the return spring, armature 92 begins to move downward, similarly moving the valve element and opening valve 10 to allow flow between the two ports. The position to which the armature is displaced, and hence the extent to which the valve is allowed to open, is controlled by the electric current in coil 30. The actual control strategy for the valve is determined as part of the overall engine control strategy embodied in engine control system 26.

Solenoid 24, as described above, endows armature 92 with a longer useful stroke in comparison to certain other valves, as shown by Figure.

Figure 3:
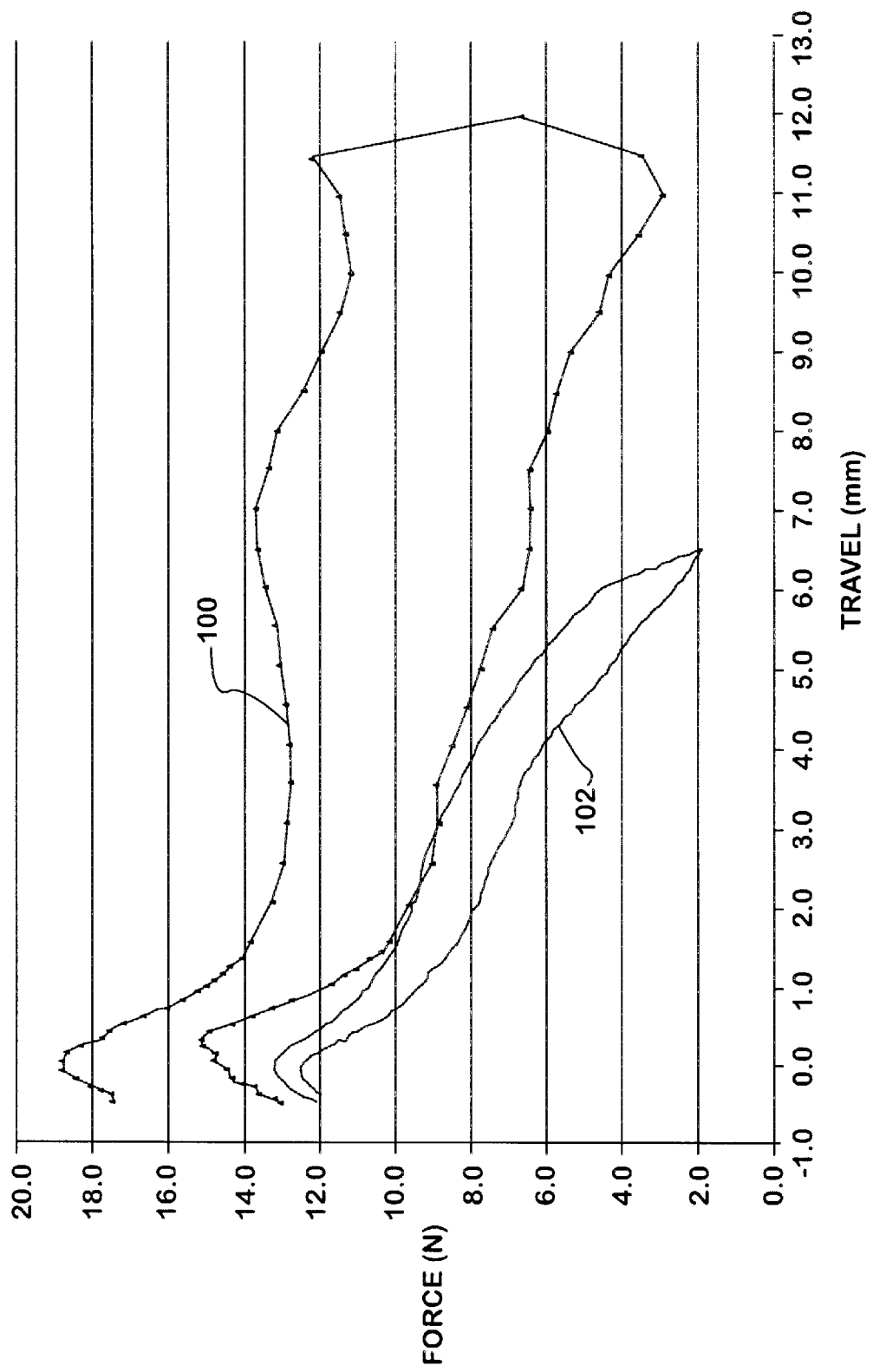
FIG. 3 is a graph plot for showing representative stroke length improvement that can be achieved with the present invention.

FIG. 3 is a graph plot showing armature force as a function of armature displacement for two different valves. The graph plot 100 is for valve 12 while the graph plot 102 is for a similar valve that has a solenoid different from solenoid 24 of valve 12. It is evident that for a given amount of current in the respective coils, valve 12 delivers force that is not only larger, but that is delivered over a larger range of armature displacements. Both plots are characterized by the presence of hysteresis. For the example given, the useful stroke length has been almost doubled, with only about a 12% increase in volume of the actuator.

It is believed that the improvement provided by the invention arises because the coil is wound directly on tube 88, instead of being wound on a synthetic bobbin that is assembled to a stator. Such direct winding provides closer coupling of the armature to the stator. Certain features of the stator, such as the various chamfers, avoid saturation in certain portions of the magnetic circuit.

While the foregoing has described a preferred embodiment of the present invention, it is to be appreciated that the inventive principles may be practiced in any form that falls within the scope of the following claims.

What is claimed is:

1. An electric-actuated control valve for controlling flow of fluid in an automotive vehicle engine system comprising:
   a valve body comprising a passageway having an inlet port for receiving fluid and an outlet port for delivering fluid;
   a valve element that is selectively positioned to selectively restrict the passage; and
   a mechanism for selectively positioning the valve element comprising a solenoid actuator comprising a bobbin having ferromagnetic pole pieces spaced axially apart, and joined by a tubular core of non-ferromagnetic metal, and an electromagnet coil comprising a length of magnetic wire wound on the tubular core between the pole pieces;
   the pole pieces forming portions of a magnetic circuit for magnetic flux created by electric current in the coil and comprising hubs that protrude into the tubular core and have juxtaposed ends defining an air gap within the tubular core through which the magnetic flux passes between the pole piece hubs;
   the mechanism further comprising an armature that is guided for motion axially of the tubular core for positioning the valve element and that comprises ferromagnetic material for conducting magnetic flux created at the air gap when electric current flows in the coil to cause an axial component of electromagnetic force to be exerted on the armature for positioning the valve element.

2. An electric-actuated control valve as set forth in claim 1 wherein the armature comprises an annular rim for conducting the magnetic flux at the air gap.

3. An electric-actuated control valve as set forth in claim 2 wherein the rim comprises a circular radially outer surface and a frostoconical tapered radially inner surface.

4. An electric-actuated control valve as set forth in claim 2 wherein both hubs comprise annular walls, one of which has a narrowing taper toward the other.

5. An electric-actuated control valve as set forth in claim 4 wherein the annular rim of the armature has a widening taper in the direction from the one annular wall toward the other annular wall.

6. An electric-actuated control valve as set forth in claim 4 including a carbon steel bearing sleeve lining the other annular wall for guiding axial travel of the armature on the other annular wall, the armature being free of guidance on the one annular wall.

7. An electric-actuated control valve as set forth in claim 1 including a plastic overmold disposed between one axial end of the electromagnet coil and a radial wall of one pole piece.

8. A solenoid actuator for an electric-actuated control valve comprising:
   a bobbin having magnetically conductive pole pieces spaced axially apart and joined by a tubular core of non-magnetically conductive metal;
   an electromagnet coil comprising a length of magnetic wire wound on the tubular core between the pole pieces;
   the pole pieces forming portions of a magnetic circuit for magnetic flux created by electric current in the coil and comprising hubs that protrude into the tubular core and have juxtaposed ends defining an air gap within the tubular core through which the magnetic flux passes between the pole piece hubs; and
   an armature that is guided for motion axially of the tubular core and conducts magnetic flux created at the air gap when electric current flows in the coil to cause an axial component of electromagnetic force to be exerted on the armature.

9. A solenoid actuator as set forth in claim 8 wherein the armature comprises an annular rim for conducting the magnetic flux at the air gap.

10. A solenoid actuator for an electric-actuated control valve comprising:
    a bobbin having pole pieces spaced axially apart and joined by a tubular core of non-magnetically conductive material;
    an electromagnet coil comprising a length of magnetic wire wound on the tubular core between the pole pieces;
    the pole pieces forming portions of a magnetic circuit for magnetic flux created by electric current in the coil and comprising hubs that protrude into the tubular core and have juxtaposed ends defining an air gap within the tubular core through which the magnetic flux passes between the pole piece hubs; and
    an armature that is guided for motion axially of the tubular core and conducts magnetic flux created at the air gap when electric current flows in the coil to cause an axial component of electromagnetic force to be exerted on the armature, wherein the armature comprises an annular rim for conducting the magnetic flux at the air gap, and the rim comprises a circular radially outer surface and a frostoconical tapered radially inner surface.

11. A solenoid actuator as set forth in claim 9 wherein both hubs comprise annular walls, one of which has a narrowing taper toward the other.

12. A solenoid actuator for an electric-actuated control valve comprising:

a bobbin having pole pieces spaced axially apart and joined by a tubular core of non-magnetically conductive material;

an electromagnet coil comprising a length of magnetic wire wound on the tubular core between the pole pieces;

the pole pieces forming portions of a magnetic circuit for magnetic flux created by electric current in the coil and comprising hubs that protrude into the tubular core and have juxtaposed ends defining an air gap within the tubular core through which the magnetic flux passes between the pole piece hubs; and an armature that is guided for motion axially of the tubular core and conducts magnetic flux created at the air gap when electric current flows in the coil to cause an axial component of electromagnetic force to be exerted on the armature;

wherein both hubs comprise annular walls, one of which has a narrowing taper toward the other, and the annular rim of the armature has a widening taper in the direction from the one annular wall toward the other annular wall.

13. A solenoid actuator as set forth in claim 11 including a carbon steel bearing sleeve lining the other annular wall for guiding axial travel of the armature on the other annular wall, the armature being free of guidance on the one annular wall.

14. A solenoid actuator as set forth in claim 8 including a plastic overmold disposed between one axial end of the electromagnet coil and a radial wall of one pole piece.

15. A method of making a solenoid actuator for an electric-actuated control valve comprising:

making a bobbin by associating magnetically conductive pole pieces with opposite axial ends of a tubular core of non-magnetically conductive material, including disposing hubs of the pole pieces within the tubular core to create an air gap between juxtaposed ends of the pole piece hubs within the tubular core through which magnetic flux can pass between the hubs;

then, winding magnet wire on the tubular core between the pole pieces to create an electromagnet coil on the bobbin; and associating an armature with the bobbin to dispose an end of the armature at the air gap within the tubular core for conducting magnetic flux created at the air gap when electric current flows in the coil and causing an axial component of electromagnetic force to be exerted on the armature, and guiding the armature for motion axially of the tubular core via one of the pole pieces.

16. A method as set forth in claim 15 including conducting the magnetic flux at the air gap through an annular rim of the armature.

17. A method of making a solenoid actuator for an electric-actuated control valve comprising:

making a bobbin by associating magnetically conductive pole pieces with opposite axial ends of a tubular core of non-magnetically conductive material, including disposing hubs of the pole pieces within the tubular core to create an air gap between juxtaposed ends of the pole piece hubs within the tubular core through which magnetic flux can pass between the hubs;

winding magnet wire on the tubular core between the pole pieces to create an electromagnet coil on the bobbin; and associating an armature with the bobbin to dispose an end of the armature at the air gap within the tubular core for conducting magnetic flux created at the air gap when electric current flows in the coil and causing an axial component of electromagnetic force to be exerted on the armature, and guiding the armature for motion axially of the tubular core via one of the pole pieces, including conducting the magnetic flux at the air gap through an annular rim of the armature that comprises a circular radially outer surface and a frostoconical tapered radially inner surface.

18. A method as set forth in claim 15 including conducting the magnetic flux from an annular tapered wall of one hub across the air gap through an annular rim of the armature to an annular wall of the other hub.

19. A method of making a solenoid actuator for an electric-actuated control valve comprising:

making a bobbin by associating magnetically conductive pole pieces with opposite axial ends of a tubular core of non-magnetically conductive material, including disposing hubs of the pole pieces within the tubular core to create an air gap between juxtaposed ends of the pole piece hubs within the tubular core through which magnetic flux can pass between the hubs;

winding magnet wire on the tubular core between the pole pieces to create an electromagnet coil on the bobbin; and associating an armature with the bobbin to dispose an end of the armature at the air gap within the tubular core for conducting magnetic flux created at the air gap when electric current flows in the coil and causing an axial component of electromagnetic force to be exerted on the armature, and guiding the armature for motion axially of the tubular core via one of the pole pieces, including conducting the magnetic flux from an annular tapered wall of one hub across the air gap to an annular wall of the other hub, including conducting the flux through an annular rim of the armature that has a widening taper in the direction from the annular wall of the one hub toward the annular wall of the other hub.

20. A method as set forth in claim 15 including guiding axial travel of the armature on a carbon steel bearing sleeve lining the other annular wall.

21. A method as set forth in claim 15 including disposing a plastic overmold between one axial end of the electromagnet coil and a radial wall of one pole piece.

* * * * *